Aug. 31, 1965 G. S. BAHRS 3,204,201
SHIELDED CIRCUIT
Filed May 18, 1960
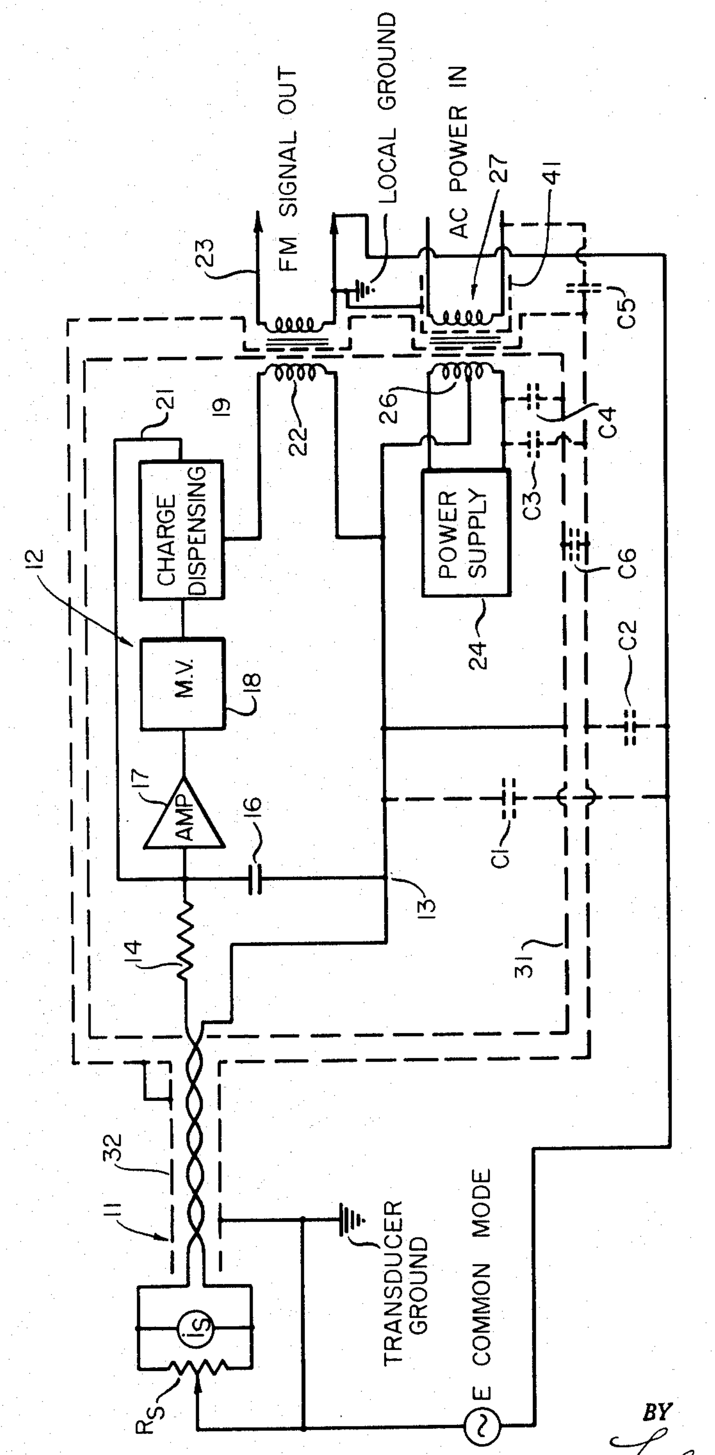
GEORGE S. BAHRS
*INVENTOR.*
*BY* Flehr and Swain United States Patent Office
3,204,201
Patented Aug. 31, 1965

3,204,201
SHIELDED CIRCUIT

George S. Bahrs, Palo Alto, Calif., assignor to Vidar Corporation, Mountain View, Calif., a corporation of California Filed May 18, 1960, Ser. No. 29,874
9 Claims. (Cl. 332—16)

This invention relates generally to a shielded circuit and more particularly to a circuit suitable for operating on relatively low input signals from grounded transducers.

In many applications, it is necessary to operate on small voltages, i.e., amplify or convert, from grounded transducers such as thermocouples or strain gauges. The output signal is applied to utilization circuits which may, for example, be computers, recorders and the like. Generally, these utilization circuits are grounded.

Often, the transducers are spaced a considerable distance from the utilization circuit. As a result, there may exist a voltage between the utilization circuit ground and the transducer ground. This voltage is referred to as the common mode voltage and a portion of it will appear at the input terminals unless provision is made for reducing its effect.

In certain prior art amplifiers, the effect of the common mode voltage is reduced by enclosing the amplifier within a shield connected to the transducer ground by means of a so-called guard terminal.

In many utilization circuits, A.-C. voltages will appear at portions of the circuit. These voltages, in general, will cause capacitive currents to flow to the surrounding shield, which currents may return through the transducer and give rise to a modulation of the input signal.

When employing circuits for operating upon relatively small voltages, the effects of noise spikes in the A.-C. power supplied to the circuits will cause currents to flow, which currents may reach the input circuit.

It is, therefore, an object of the present invention to provide an improved shielded circuit.

It is another object of the present invention to provide a circuit which includes a pair of shields for reducing the effects of common mode voltages and circuit induced voltages.

It is a further object of the present invention to provide a circuit which is relatively immune to power line noise.

It is a further object of the present invention to provide a circuit in which the circuit common point is connected to a first shield surrounded by a second shield with A.-C. power coupled through the two shields.

It is still another object of the present invention to provide a voltage to frequency converting circuit doubly shielded with input power and output signals coupled to and from the circuit by transformers.

These and other objects of the invention will become more clearly apparent from the following description when taken in conjunction with the accompanying single figure of drawing.

The invention is described with reference to a particular circuit which is schematically illustrated in block diagram form in the sole figure of the drawing. The circuit shown is a voltage controlled oscillator and may be of the general type described in copending application Serial No. 338, filed January 4, 1960, now Patent No. 3,022,469, issued February 20, 1962. It will be apparent to one versed in the art that the invention is applicable to other circuits having the same or similar problems. The invention is not limited in this respect.

The voltage controlled oscillator illustrated includes an amplifier 17 which amplifies the voltage of the capacitor 16 and applies the same to a monostable multivibrator 18. The multivibrator operates to change states when the voltage reaches a predetermined level. Each time the multivibrator is operated, it activates a charge dispensing circuit which dispenses a predetermined standard charge. This charge is fed back along the line 21 to the capacitor 16 and acts in opposition to the input signal to maintain the capacitor voltage substantially constant. Thus, as the input signal increases, the frequency of operation of the multivibrator and the standard charge dispensing circuit will increase thereby feeding back more charge.

Referring to the drawing, the transducer is represented by its Norton equivalent which includes the shunt resistance $R_S$ and a current source $i_S$. The transducer is grounded. A shielded cable 11 serves to connect the transducer terminals to the voltage controlled oscillator designated generally by the reference numeral 12. One terminal of the transducer is connected to the circuit common point 13 and the other lead is resistively connected through resistor 14 to the input capacitor 16.

Suitable means are provided for coupling out of the circuit a frequency which is proportional to the frequency of operation of the charging circuit. Such means is illustrated as a transformer with the primary 22 suitably connected in the circuit. The output signal is obtained at the secondary 23 of the transformer and is shown connected to local ground which would be present for most utilization circuits. There is schematically illustrated a power supply 24 for supplying voltages to the circuit. The power supply receives A.-C. power from the center tapped secondary 26 of the input transformer 27.

In accordance with the present invention, a first shield 31 is provided which partially or completely encloses the power supply, the primary 22 of the output transformer, the secondary 26 of the input transformer, and the circuit which operates on the signal, in this instance the voltage controlled oscillator. The shield 31 is electrically connected to the common point of the circuit. A second shield surrounds the first shield and is electrically connected to the outer shield 32 of the shielded input cable 11. The shield 32 is grounded at the transducer as indicated. In the circuit shown, the common mode voltage E, which can arise due to induced voltages or ground currents, is indicated as appearing between local ground and transducer ground.

In the absence of appropriate shielding, the common mode voltage will cause undesired currents to flow through $R_S$, thus causing an undesired signal to appear at the input terminals.

To reduce the effects of the common mode voltage, the circuit is "floated" within an outer shield. A.-C. power is coupled in by means of a transformer and the output is coupled out by means of a transformer.

Assuming no guard shield, the stray capacity $C_1$ between the voltage controlled oscillator and the local ground plane would make the voltage controlled oscillator responsive to the common mode voltage. This arises from the fact that the voltage controlled oscillator common point and the instrument ground plane differ in A.-C. potential by a fraction of the common mode voltage. This voltage difference gives rise to a flow of capacitive current through the capacitor $C_1$. In order for this current to flow, it must flow through a portion of the transducer resistance $R_S$ and would thereby cause a portion of the common mode signal to appear across the transducer. The voltage controlled oscillator would respond to this common mode signal with resultant undesired modulation of the output signal.

To eliminate this problem, a second or outer shield surrounds the circuit and is returned to transducer ground (through the input cable shield, if desired). Since the voltage controlled oscillator is then completely surrounded by a conductor which is at the same potential as the transducer ground, virtually no capacitive currents flow through the signal leads or through the resistance $R_S$. Instead, the capacitive current flowing through $C_2$ is routed, through the shield and cable braid, to the transducer ground point.

Considering one of the secondary leads of the transformer 27, a moderately high voltage appears on this lead. In the absence of an inner shield, the stray capacitance $C_3$ which would exist between the secondary lead and the outer shield would pass capacitive currents. These currents would flow through the shield system to the transducer ground, from there through a portion of $R_S$, and back to the voltage controlled oscillator common point 13.

By employing an inner shield, capacitive currents flow from the circuitry to the inner shield. By connecting the inner shield directly to the common point 13 of the circuitry, the capacitive currents are made to return directly to the common point and are prevented from flowing through any part of $R_S$. Thus, the inner shield overcomes the problem of undesired modulation due to the A.-C. voltages appearing in the voltage controlled oscillator circuitry.

In circuits of the foregoing character, serious disturbances on the input power line may cause modulation of the input signal. These disturbances may be due to heavy loads going on and off the power line and may be at frequencies other than 60 cycles.

Assume large disturbances on the power line and that the transformer shield 41 is not present, then the stray capacitance $C_5$ between the lines and the outer shield will cause capacitive currents to flow in the outer shield. Since the outer shield is grounded through the input shielded cable braid and since the shield braid will have some inductance and some resistance, these currents may give rise to voltage drops. Any such voltage will appear between the inner and outer shields. Because of the intershield capacitance $C_6$, currents will flow through the resistance $R_S$. To reduce these effects, the primary winding of the A.-C. power transformer is shielded by the shield 41.

A voltage controlled oscillator of the type described was constructed. The circuit details were in accordance with those of said copending application. The power transformer was a triple shielded transformer. The FM output transformer was constructed by using miniature shielded cable to wind the primary and secondary windings on a toroidal core. The transducer resistance was 2000 ohms grounded in the center.

The circuit was operated to test its ability to reject the common mode signals. For this purpose, a 60 cycle 32 volt peak common mode signal was applied. The resultant modulation was 54 db below the modulation produced by a 6 millivolt peak transducer signal. 32 volts is 75 db greater than the 6 millivolts. Thus, it is seen that the common mode rejection at 60 cycles is 129 db. For a 500 cycle common mode signal, the common mode rejection was measured at 115 db.

I claim:

1. A circuit of the type adapted to operate on signals from and coupled to a transducer having a predetermined ground, said circuit including a common point, a first shield substantially surrounding the circuit and electrically connected to the common point, and a second shield surrounding the first and electrically connected to transducer ground.

2. A circuit of the type adapted to operate on signals from and coupled to a transducer having a predetermined ground, said circuit including a common point, a first shield substantially surrounding the circuit and electrically connected to the common point, a second shield surrounding the first and electrically connected to transducer ground, a power transformer for supplying power to the circuit having primary and secondary windings, the secondary windings disposed within the first and second shields and the primary windings disposed outside the first and second shields, and a third shield serving to shield the primary windings of the transformer from the outer shield.

3. A circuit of the type adapted to operate on signals from and coupled to a transducer having a predetermined ground, said circuit including a common point, output terminals, a first shield substantially surrounding the circuit and electrically connected to the common point, a second shield surrounding the first and electrically connected to transducer ground, the output of said circuit being coupled to the output terminals by a transformer having primary windings within said first and second shields and secondary windings external thereto, a power transformer for supplying voltage to said circuit having primary and secondary windings, the secondary windings disposed within said first and second shields and the primary windings outside the shields, and a third shield serving to shield the primary windings of said power transformer from the outer shield.

4. A voltage controlled oscillator circuit adapted to receive a signal from and coupled to an input source having a predetermined ground and provide an output signal whose frequency is modulated in accordance with the input signal, said oscillator including a common point, a first shield substantially surrounding the voltage controlled oscillator and electrically connected to the common point, a second shield surrounding the first and electrically connected to said predetermined ground, and an output transformer having primary windings disposed within the first and second shields and secondary windings outside the shield and adapted to provide the output signal.

5. A voltage controlled oscillator circuit as in claim 4 wherein power is applied to said circuit by a power transformer having primary and secondary windings, the secondary windings disposed within the shields and the primary windings outside the shields, and a third shield serving to shield the primary windings of said power transformer from the outer shield.

6. A voltage controlled oscillator circuit as in claim 4 wherein power is applied to said circuit by a power transformer having primary and secondary windings, the secondary windings disposed within the shields and the primary windings outside the shields.

7. A circuit of the type adapted to operate on signals from and coupled to a transducer having a predetermined ground, said circuit including a common point, a first shield substantially surrounding the circuit and electrically connected to the common point, a second shield surrounding the first and electrically connected to transducer ground, and a power transformer for supplying power to the circuit having primary and secondary windings, the secondary windings disposed within the first and second shields and the primary windings disposed outside the first and second shields.

8. A circuit of the type adapted to operate on signals from and coupled to a transducer having a predetermined ground, said circuit including a common point, output terminals, a first shield substantially surrounding the circuit and electrically connected to the common point, a second shield surrounding the first and electrically connected to transducer ground, the output of said circuit being coupled to the output terminals by a transformer having primary windings within said first and second shields and secondary windings external thereto, and a power transformer for supplying voltage to said circuit having primary and secondary windings, the secondary windings disposed within said first and second shields and the primary windings outside the shields.

9. A circuit of the type adapted to operate on signals from and coupled to a transducer having a predetermined ground, a local ground and a common mode voltage between the transducer ground and said local ground, a common point, a first shield substantially surrounding the circuit and electrically connected to the common point, and a second shield surrounding the first and electrically connected to the transducer ground, said local ground being outside said shield.

References Cited by the Examiner

UNITED STATES PATENTS

| | | | |
|---|---|---|---|
| 1,805,942 | 5/31 | Ferris | 325—357 |
| 2,285,437 | 6/42 | Johannson | 315—85 |
| 2,658,101 | 11/53 | Coxe | 174—51 |
| 2,951,149 | 8/60 | Grieg et al. | 250—16 |
| 3,039,042 | 6/62 | Chatterton | 336—84 |
| 3,100,282 | 8/63 | Fletcher | 330—68 |

ROY LAKE, *Primary Examiner.*

L. MILLER ANDRUS, ARTHUR GAUSS, *Examiners.*